July 15, 1969     R. D. MALTESE     3,454,975
PLASTERER'S DARBY
Original Filed July 18, 1966
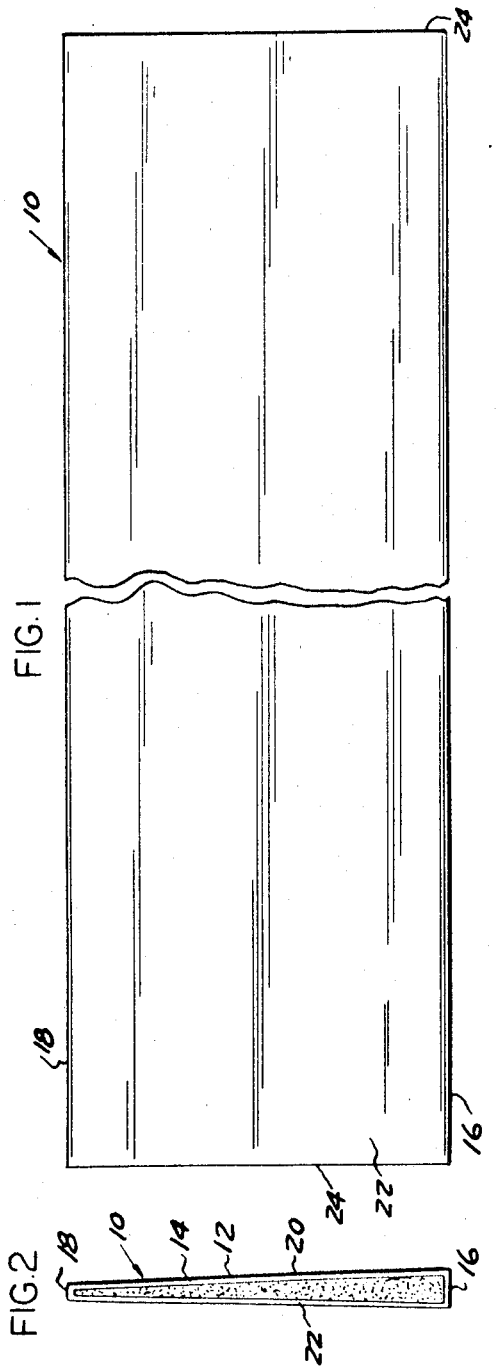
INVENTOR
ROY D. MALTESE
BY Barthel & Bugbee
ATTORNEYS

United States Patent Office 3,454,975
Patented July 15, 1969

1

3,454,975
PLASTERER'S DARBY
Roy D. Maltese. 21188 W. Outer Drive,
West Dearborn, Mich. 48124
Original application July 18, 1966, Ser. No. 565,987, now Patent No. 3,384,917, dated May 28, 1968. Divided and this application Sept. 22, 1967, Ser. No. 669,778
Int. Cl. E04g 23/02
U.S. Cl. 15—235.4                4 Claims

ABSTRACT OF THE DISCLOSURE

This plasterer's darby consists of an elongated relatively thin body of wedge-shaped cross-section with a substantially straight thinner forward edge. It is constructed with an elongated core of synthetic foam plastic or balsa wood with an outer covering of fibrous glass material preferably composed of a plurality of layers of woven fibrous glass fabric impregnated with synthetic plastic material.

This is a division of my co-pending application Ser. No. 565,987 filed July 18, 1966 for Plasterer's Darby, which on May 28, 1968 became U.S. Patent No. 3,384,917.

In the drawing, FIGURE 1 is a top plan view of a darby according to one form of the invention, with the central portion omitted to conserve space; and FIGURE 2 is a left-hand end elevation of the darby shown in FIGURE 1.

Referring to the drawing in detail, FIGURE 1 shows a plasterer's darby, generally designated 10, of any suitable length, for example four feet, and composed of an outer layer 12 of plastic impregnated fibrous material, such as fibrous glass, preferably in woven fabric form and surrounding a core 14 of resilient foam plastic material, such as polystyrene, urethane, epoxy or phenolic synthetic resin in foam. Balsa wood may also be used for the core 14. The outer layer 12 is conveniently made up of a plurality of layers of fibrous material impregnated with synthetic resin such as polyester or epoxy resin. Rayon or nylon fibers, as well as metal strand or wire may also be used to replace glass fibers in the outer layer 12. The darby 10 of FIGURES 1 and 2 is of wedge-shaped cross-section with a thick rearward edge 16 and a thin straight forward edge 18 interconnected by smooth flat upper and lower faces 20 and 22 extending between opposite ends 24. In actual practice, thicknesses of 0.75 inch and 0.15 inch for the thick edge 16 and thin edge 18 respectively, with a width of 5.75 inches and a length of 48 inches, has been found suitable. These dimensions are given by way of example rather than limitation.

2

In the use of the darby 10, the operator grasps it with the portion adjacent the thick edge 16 between his fingers and draws it over the surface of the plaster after the plaster has been applied with a plasterer's trowel from a plasterer's hawk. The outer layer 12 is found to wear better than darbies of conventional materials, and the darby 10 with the foam core 14 is lighter and consequently can be made longer and wider in order to cover more plaster surface at a given time. From its resilience, the darby 10 resumes its original shape when bent and does not ordinarily acquire dents, like metal or wooden darbies. Moreover, the plaster, which ordinarily corrodes aluminum or magnesium darbies, has no corrosive effect whatever upon the present darby 10.

What I claim is:
1. A plasterer's darby, comprising
   an elongated resilient composite body of approximately rectangular outline having a length a plurality of times its width and a multiplicity of times its thickness,
      said body having an inner core composed of porous resilient material,
      said body having an outer plaster-engaging layer composed of resilient fibrous material impregnated with synthetic plastic and having a smooth flat upper surface with a substantially straight forward edge thereon,
      said body and core being of wedge-shaped cross-section with their forward edges thinner than their rearward edges.
2. A plasterer's darby, according to claim 1, wherein the fibrous material is fibrous glass.
3. A plasterer's darby, according to claim 1, wherein the fibrous material includes synthetic plastic fibers and wherein the impregnating synthetic plastic is a dissimilar synthetic plastic from the synthetic plastic of said fibers.
4. A plasterer's darby, according to claim 1, wherein said core is composed of foam material and wherein an external layer of plastic-impregnated glass material overlies said core.

References Cited

UNITED STATES PATENTS

| 2,217,369 | 10/1940 | Jacobsen et al. |           |
|-----------|---------|-----------------|-----------|
| 2,608,852 | 9/1952  | Whalen          | 15—235.4  |
| 3,018,499 | 1/1962  | Levy            | 15—235.4  |
| 3,302,233 | 2/1967  | Sebastiani      | 15—235.4  |

WILLIAM I. PRICE, Primary Examiner

ROBERT L. SMITH, Assistant Examiner